United States Patent
Godet et al.

(10) Patent No.: US 10,136,256 B2
(45) Date of Patent: Nov. 20, 2018

(54) METHOD FOR DETERMINING THE POSITION OF A PORTABLE USER DEVICE AROUND A VEHICLE AND ASSOCIATED LOCATION DEVICE

(71) Applicants: CONTINENTAL AUTOMOTIVE FRANCE, Toulouse (FR); CONTINENTAL AUTOMOTIVE GmbH, Hannover (DE)

(72) Inventors: Sylvain Godet, Saint-Cezert (FR); Frederic Merlet, Fontenilles (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/459,904

(22) Filed: Mar. 15, 2017

(65) Prior Publication Data

US 2017/0272907 A1    Sep. 21, 2017

(30) Foreign Application Priority Data

Mar. 16, 2016   (FR) ..................................... 16 52223

(51) Int. Cl.
*H04W 24/00*    (2009.01)
*H04W 4/02*    (2018.01)
(Continued)

(52) U.S. Cl.
CPC ............. *H04W 4/023* (2013.01); *E05B 77/48* (2013.01); *G01S 5/0252* (2013.01);
(Continued)

(58) Field of Classification Search
CPC ....... H04W 4/02; H04W 4/021; H04W 4/046; H04W 24/08; H04W 48/02; H04W 48/04;
(Continued)

(56) References Cited

U.S. PATENT DOCUMENTS 8,145,199 B2 * 3/2012 Tadayon ............. H04B 5/0062
455/418
8,315,617 B2 * 11/2012 Tadayon ................. H04W 4/50
455/418
(Continued)

FOREIGN PATENT DOCUMENTS

FR       3 023 314 A1     1/2016
WO    2015/035501 A1     3/2015

OTHER PUBLICATIONS

French Search Report, dated Nov. 15, 2016, from corresponding French application.

*Primary Examiner* — Joseph Arevalo
(74) *Attorney, Agent, or Firm* — Young & Thompson (57) ABSTRACT

Disclosed is a method of determining the position of a portable user device around a vehicle by a location device placed on board the vehicle and communicating with the portable device by radio waves, including the execution of the following steps whenever the portable device receives a signal from the location device: step E3: Measuring and storing a value of strength of the signal) thus received; step E4: Measuring and storing a value of acceleration) of the portable device; step E5: Calculating a ratio between a variation of the strength value thus measured, relative to a strength value stored at a preceding instant-RSSI, and a variation of the acceleration value thus measured, relative to an acceleration value stored at the preceding instant-AC; step E6: Comparing the ratio thus calculated with at least one predetermined threshold, in order to determine a distance between the portable device and the vehicle.

15 Claims, 4 Drawing Sheets

(51) Int. Cl.
*H04B 17/318* (2015.01)
*G01S 5/02* (2010.01)
*E05B 77/48* (2014.01)
*G01S 11/06* (2006.01)
*G01S 13/82* (2006.01)
*G07C 9/00* (2006.01)

(52) U.S. Cl.
CPC .............. *G01S 5/0263* (2013.01); *G01S 11/06* (2013.01); *G01S 13/825* (2013.01); *G07C 9/00174* (2013.01); *G07C 9/00309* (2013.01); *H04B 17/318* (2015.01); *H04W 4/027* (2013.01); *G07C 2209/63* (2013.01)

(58) Field of Classification Search
CPC ......... H04M 1/72569; H04M 2207/18; H04M 2242/14; H04M 3/436; H04M 3/53; H04M 1/72577; H04M 3/54
USPC ............................ 455/418, 456.3, 456.4, 573
See application file for complete search history.

(56) References Cited

U.S. PATENT DOCUMENTS

| | | | |
|---|---|---|---|
| 8,946,938 B2* | 2/2015 | Kesler | B60L 11/182 307/104 |
| 9,692,902 B2* | 6/2017 | Tadayon | H04W 4/50 |
| 9,794,753 B1* | 10/2017 | Stitt | H04B 17/318 |
| 2016/0055742 A1 | 2/2016 | Wang et al. | |

* cited by examiner

METHOD FOR DETERMINING THE POSITION OF A PORTABLE USER DEVICE AROUND A VEHICLE AND ASSOCIATED LOCATION DEVICE

BACKGROUND OF THE INVENTION

Field of the Invention

The present invention relates to the field of motor vehicles and concerns, more particularly, a method for determining the position of a portable user device in a predetermined area around a vehicle; it also concerns an associated location device and an associated portable device.

Description of the Related Art

At the present time, some motor vehicles are capable of communicating with devices carried by the users of these vehicles, for example an electronic contact key or a smartphone (or "intelligent" telephone in French).

The communication between a vehicle V (see FIG. 1) and a portable user device SD of this type makes it possible, for example, to detect the presence of the user U in a predetermined detection area ZD around the vehicle V, in order to activate certain functions of the device when the user U moves toward or away from the vehicle. By way of example, these functions may be the locking or unlocking of the passenger compartment of the vehicle V, also called "hands-free access" to the vehicle, or adjustments of equipment such as the seats, the rear-view mirrors, the air conditioning, or the like.

There may be more than one predetermined detection area, namely a first predetermined area ZD1 and a second predetermined area ZD2, larger than the first said area, defined on the basis of the distance D1, D2 between the portable device SD and the vehicle V.

The actions performed by the vehicle V differ according to whether the portable device SD is located in the first predetermined area ZD1 or in the second predetermined area ZD2.

In order to detect the presence of a portable user device SD in the detection area ZD, the vehicle V periodically transmits, via an antenna A, a radio signal including what is known as a broadcast message. If the portable user device SD receives this signal via its integrated antenna, it measures the power of the signal, which in a known way is referred to as the RSSI ("Received Signal Strength Indication") and sends this value to the vehicle V in a transmission signal. The vehicle then uses this power value to estimate the distance D between the location of the portable user device SD and the vehicle V, and thus to determine whether or not the user U is present in the detection area ZD.

However, it has been found that the human body may have a negative effect on the performance of the antenna of the portable user device SD, depending on its position relative to the human body. This is because the antenna of the portable user device SD may be oriented in a random and arbitrary way during its approach to the vehicle V, and the tissues of the human body may absorb some of the radio signals transmitted or received by the antenna of the portable user device SD, causing an antenna impedance mismatch, resulting in a loss of power radiated toward the body of the user U which may, for example, be as much as 25 dB.

The power loss caused by the position of the portable user device SD on the body reduces the value of the RSSI, measured by the portable user device SD and sent to the vehicle V, so that the estimated distance values D may be incorrect, resulting in errors in the detection of the presence of the user U in the detection area ZD, causing a considerable problem.

A disparity has also been found in the RSSI measurement performance depending on the type of smartphone used.

There is an increasing variety of smartphones on the market, meaning that there is also a variety of electronic circuits for measuring the RSSI value.

More precisely, the gain of the receiving antenna of the smartphone and the amplification of said measurement differ from one smartphone to another. This gives rise to a non-negligible error in the RSSI measurement performed by the smartphone, and therefore in the estimated distance D between the smartphone SD and the vehicle V. Since the value of the distance D is erroneous, the actions performed by the vehicle V are no longer appropriate to the true distance D between the portable device SD and the vehicle V. Thus the vehicle V may issue an unlocking command when the portable device SD is actually located too far from the vehicle V for this action.

Figure 2:
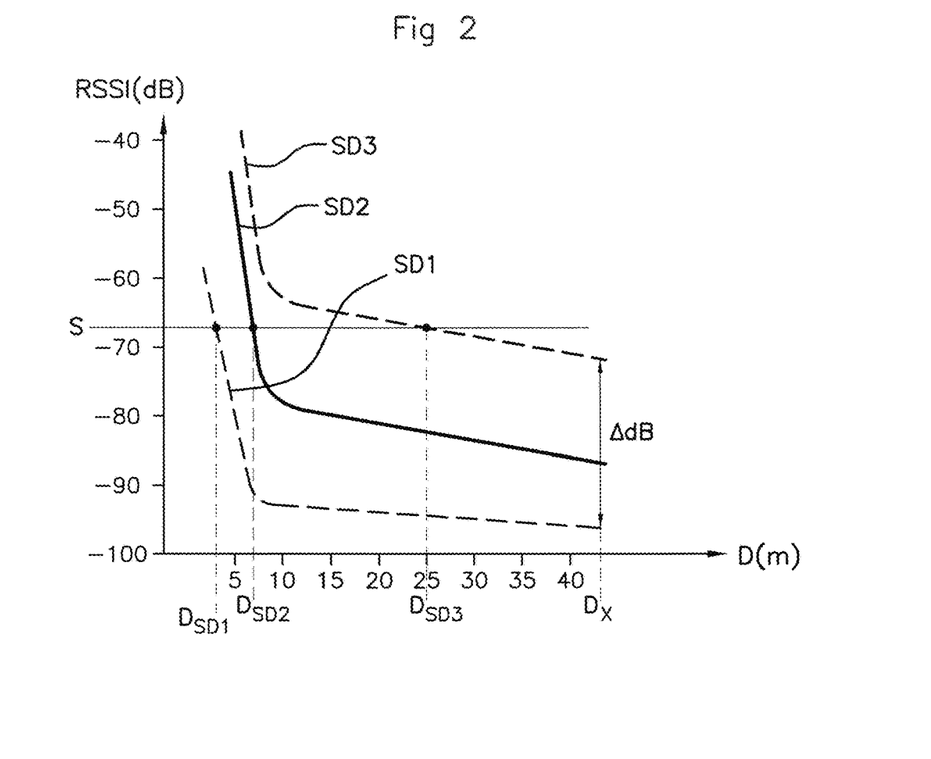

This is illustrated in FIG. 2. FIG. 2 shows the estimated values of distance D according to the RSSI values measured by three different types of smartphones, SD1, SD2, and SD3.

It is evident from this graph that a measured RSSI value "5", for example S=68 dB, corresponds to three different estimated distances $D_{S1}$, $D_{S2}$, $D_{S3}$, between the smartphone SD and the vehicle V, depending on the type of smartphone SD1, SD2, or SD3 that made the RSSI measurement.

For the first type of smartphone SD1, the estimated distance $D_{S1}$ is 4 m; for the second type of smartphone SD2, the estimated distance $D_{S2}$ is 6 m; and for the third type of smartphone SD3, the estimated $D_{S3}$ is 25 m.

Vice versa, for a given distance threshold Dx between the smartphone SD and the vehicle, the variation ΔdB of the corresponding RSSI measurement may reach 30 dB.

This variability in the RSSI measurement for the same distance between the portable device and the vehicle also appears, although to a lesser degree, when the portable user device is a hands-free access badge.

SUMMARY OF THE INVENTION

The invention is intended to overcome these drawbacks, at least partially, by proposing a simple, reliable and effective solution for improving the detection of the presence of a portable user device in the detection area around a motor vehicle, regardless of the position of the portable device on the user's body and regardless of the type of portable device used.

The invention proposes a method of determining the position of a portable user device around a vehicle by means of a location device placed on board said vehicle and communicating with the portable device by radio waves, said portable device being equipped with first means for measuring the received signal strength, and with second means for acceleration measurement, said method being remarkable in that, whenever the portable device receives a signal from the location device, it comprises the following steps:

step E3: Measuring and storing a value of strength of the signal thus received, step E4: Measuring and storing a value of acceleration of the portable device, step E5: Calculating a ratio between a variation of the strength value thus measured, relative to a strength value stored at a preceding instant, and a variation of the acceleration value thus measured, relative to an acceleration value stored at said preceding instant, step E6: Comparing the ratio thus calculated with at least one predetermined threshold in order to determine a distance between the portable device and the vehicle.

Thus the invention advantageously enables the distance between the portable device and the vehicle to be determined precisely, regardless of the type of portable device, by calculating the derivative of the RSSI measurement with respect to the acceleration of the portable device.

In a second embodiment of the determination method, said method comprises, before step E5, a step of calculating a distance covered on the basis of the variation of the acceleration value thus measured, relative to an acceleration value stored at a preceding instant, and step E5 consists in calculating a ratio between the variation of the strength value thus measured, relative to a strength value stored at said preceding instant, and the distance covered, step E6 consists in comparing the ratio thus calculated with a predetermined threshold in order to determine a distance between the portable device and the vehicle.

Advantageously, the determination method comprises a preliminary step of determining the distance between the portable device and the vehicle for a plurality of portable devices on the basis of the ratio between a variation of the value of the strength of the signal received between two consecutive instants, and a variation of the value of acceleration of the portable device between said two consecutive instants.

According to the second embodiment, the determination method comprises a preliminary step of determining the distance between the portable device and the vehicle for a plurality of portable devices on the basis of the ratio between a variation of the value of the strength of the signal received between two consecutive instants, and the distance covered by the portable device between said two consecutive instants.

The determination method according to the invention may also comprise:

during step E3, after the measurement of the strength value measured by the portable device, a step of sending the strength value to the location device, so that said location device stores said strength value, during step E4, after the measurement of the acceleration value measured by the portable device, a step of sending the acceleration value to the location device, so that said location device stores said acceleration value.

The invention also relates to a location device for the location of a portable user device around a vehicle, said device being on board the vehicle, and communicating with the portable device by radio waves, said device comprising means for receiving a signal strength value sent by the portable device, said device being remarkable in that it further comprises:

means for receiving an acceleration value sent by the portable device, means for storing the strength values and acceleration values thus received, a clock, means for calculating a ratio between a variation of the strength value thus measured, relative to a strength value stored at a preceding instant, and a variation of the acceleration value thus measured, relative to an acceleration value stored at said preceding instant, and means for comparing the ratio thus calculated with at least one predetermined threshold, in order to determine a distance between the portable device and the vehicle.

In a second embodiment, the location device further comprises means for calculating a distance covered between two consecutive instants by the portable device, on the basis of the received measurements of the acceleration value, and:

the calculation means consist of means for calculating a ratio between a variation of the strength value thus measured between said two consecutive instants and the distance covered, and the comparison means consist of means for comparing the ratio thus calculated with at least one predetermined threshold, in order to determine a distance between the portable device and the vehicle.

The invention also relates to a portable user device, communicating by radio waves with a location device on board a motor vehicle, the portable device being designed to be located around the vehicle by said location device, said portable device comprising first means for measuring a received radio signal strength value and second means for measuring a value of acceleration of said portable device, first means for transmitting said strength value to the location device, and a clock, said portable user device being remarkable in that it further comprises:

second means for transmitting the acceleration value thus measured to the location device.

The invention is applicable to any vehicle comprising a location device according to any of the characteristics listed above, and to any system comprising a vehicle equipped with a location device and a portable device according to the characteristics listed above.

BRIEF DESCRIPTION OF THE DRAWINGS

Other objects, characteristics and advantages of the invention will be apparent from a reading of the following description, provided by way of non-limiting example, and from a perusal of the appended drawings, in which.

DESCRIPTION OF THE PREFERRED EMBODIMENTS

Figure 1:
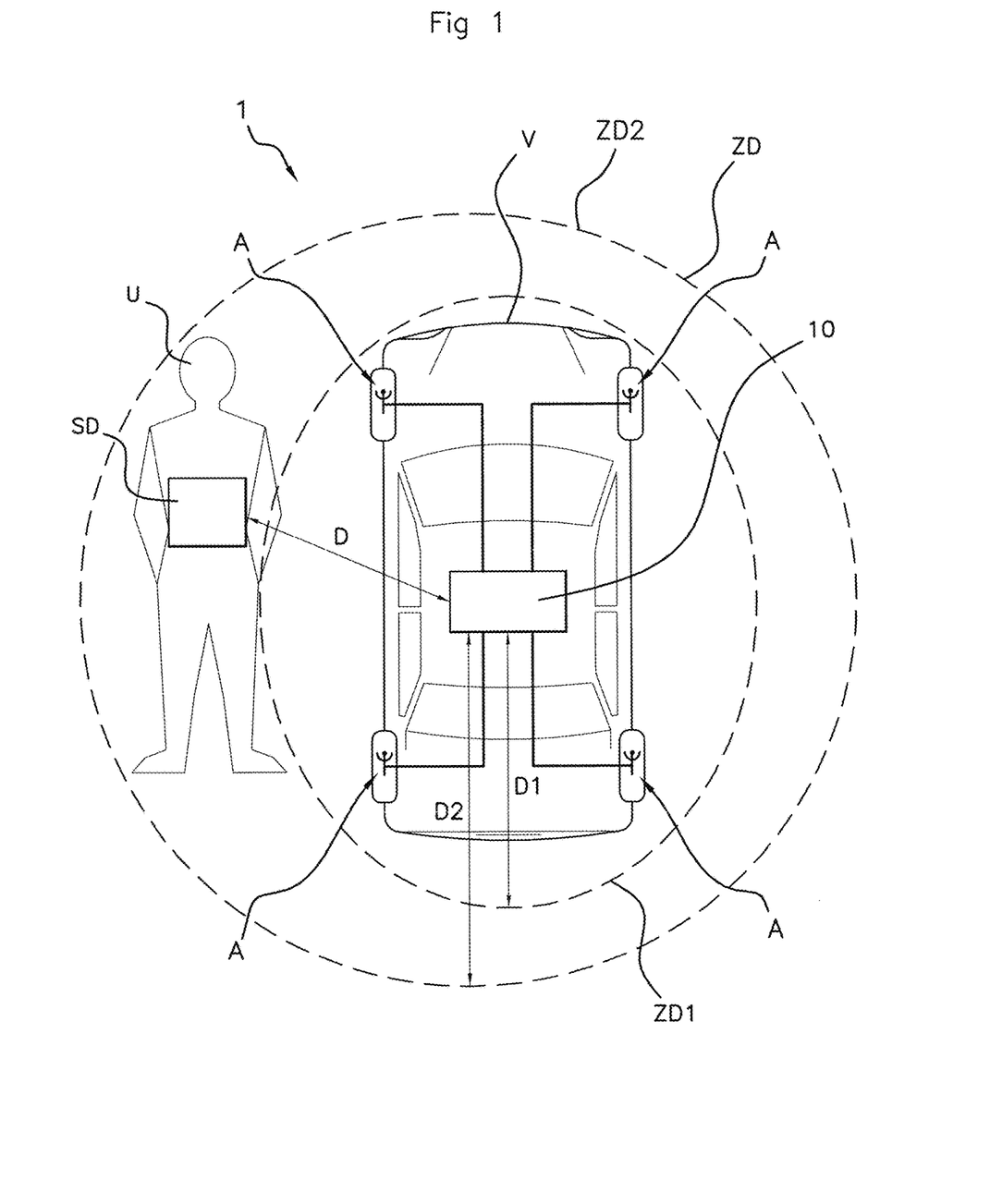
FIG. 1, explained above, is a schematic representation of a system comprising a vehicle V and a portable user device SD according to the prior art, FIG. 2, explained above, is a graphic representation of the variations of RSSI measurement and of the determination of the distance D between the portable user device SD and the vehicle V according to different types of user device SD1, SD2, SD3, according to the prior art.

FIG. 1 depicts a system 1 comprising a vehicle V and a portable user device SD carried by a user U.

The vehicle V comprises a location device 10, in the form of an electronic control unit of the microcontroller type. The location device 10 is connected electronically to at least one antenna A located on the vehicle V. The vehicle V usually comprises three or four antennas A, located at the doors for example, and connected to the location device 10.

The location device 10 causes radio waves to be transmitted, by means of the antennas A, to the portable user device SD.

The antennas A transmit waves called LF waves (for "Low Frequency"), at 125 kHz, at regular intervals. If the portable device SD is in the receiving area of said waves, it sends back to the vehicle V an RF signal comprising the measurement of the strength of the LF signal that it has received, called the RSSI ("Received Signal Strength Indication") signal.

The location device 10 then determines, on the basis of this RSSI value, the distance D between the portable device SD and the vehicle V.

If the portable device SD is located in a predetermined area ZD around the vehicle V, certain functions are then activated by the vehicle V (such as automatic door unlocking, switching on the passenger compartment lighting, etc.).

Purely for the purposes of explanation, FIG. 1 shows only two predetermined areas ZD1, ZD2, although there may be more than two predetermined areas around the vehicle V, and each predetermined area corresponds to an action performed by the vehicle V.

It is therefore important to have a precise knowledge of the position of the portable device SD in said predetermined areas ZD1, ZD2, for example in order to prevent the automatic unlocking of the door if the portable device SD is located in the widest predetermined area ZD2 around the vehicle V, and to enable unlocking only if said device is located in the predetermined area ZD1 nearest to the vehicle V.

This location method is known from the prior art and will not be detailed further here.

As explained above, the precision of the RSSI measurement according to the prior art varies significantly with the type of portable user device SD, which affects the precision of the determination of the distance D between the portable user device SD and the vehicle V.

The invention proposes a method of determining the position of the portable device SD' around the vehicle, a portable device SD', and a location device 10', enabling the distance D between the portable device SD' and the vehicle V to be determined precisely for all types of portable device SD'.

Figure 6:
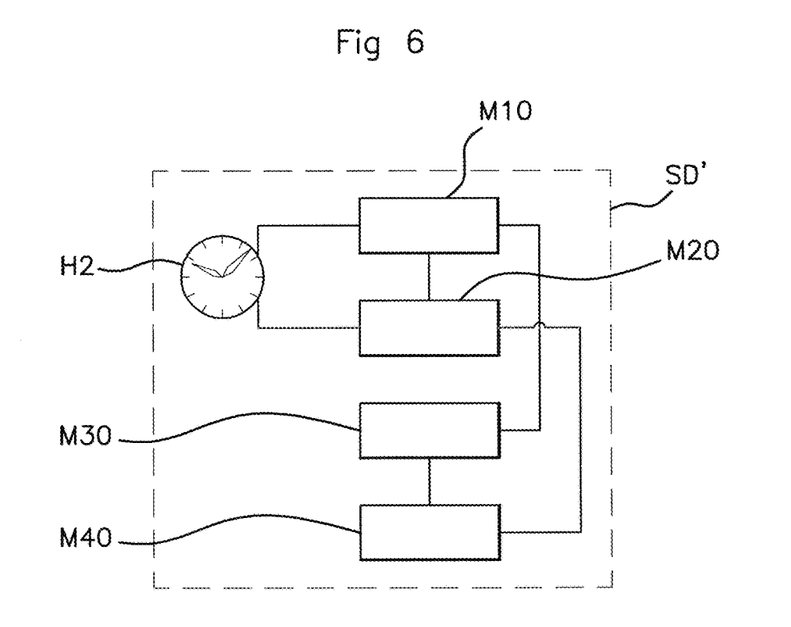
FIG. 6 is a schematic representation of the portable user device according to the invention.

According to the invention, the portable device SD' is, for example, of the smartphone type, and is equipped in such a way that it can communicate with the location device 10' via radio waves; it comprises a radio frequency antenna (not shown) and an electronic transmission/reception circuit (not shown) connected to the antenna. Said portable device SD' also comprises (see FIG. 6):

first measurement means M10 for measuring a strength value RSSI of a signal which the portable device SD' receives from the vehicle V, first transmission means M30 for transmitting said measured strength value (RSSI value) to the vehicle V (or more precisely to the location device 10', by means of the antennas A located on the vehicle V).

The portable device SD' also comprises second measurement means M20 for measuring an acceleration value AC of the portable device SD', for example an accelerometer, or an acceleration measurement sensor such as an internal clock H2.

The clock H2 may be a counter or an electronic clock.

According to the invention, the portable device SD' further comprises (see FIG. 6) second transmission means M40 for transmitting the acceleration value C to the location device 10'. The transmission means M40 take the form of software, and can be used to transmit said value by means of the antenna and the transmission/reception circuit of the portable device SD'.

The location device 10' on board the vehicle V, is a control unit of the microcontroller type. Said device 10' is adapted to communicate with the portable device SD' by radio waves, using the antennas A to which it is connected. Said device 10' comprises (see FIG. 5) receiving means M1 for receiving RSSI values, or values of the strength of the signal received by the portable device SD', sent to it by the portable device SD'.

Figure 5:
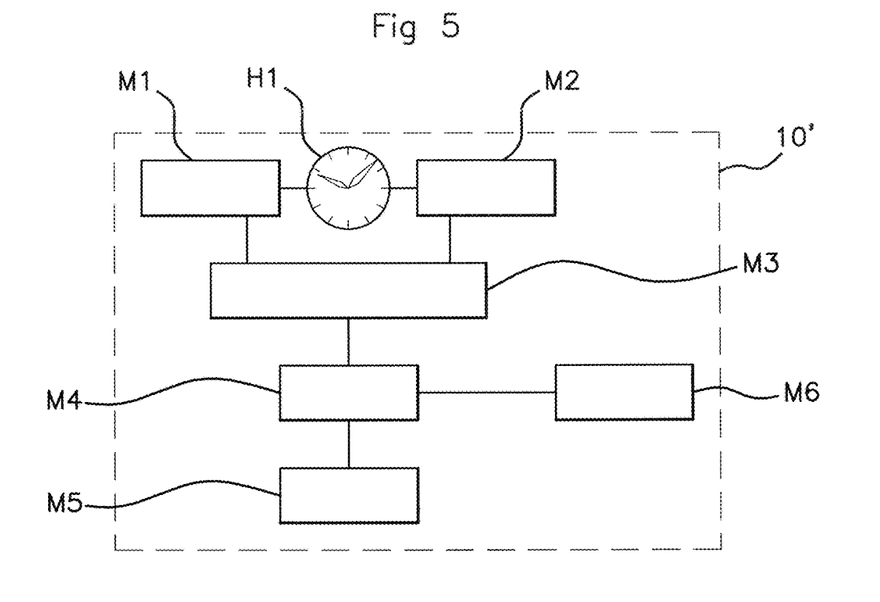
FIG. 5 is a schematic representation of the location device according to the invention.

According to the invention (see FIG. 5), the location device 10' further comprises:

receiving means M2 for receiving an acceleration value AC sent by the portable device SD', storage means M3 for storing the strength values RSSI and acceleration values AC thus received, a clock H1, means M4 for calculating a ratio R between a variation of the strength value RSSI(t) thus measured, relative to a strength value RSSI(t−1) stored at a preceding instant, and a variation of the acceleration value AC(t) thus measured, relative to an acceleration value AC(t−1) stored at said preceding instant, and means M5 for comparing the ratio R thus calculated with at least one predetermined threshold S1, S2, in order to determine a distance D between the portable device SD' and the vehicle V.

The receiving means M2 are connected to the antennas A and take the form of an electronic receiving circuit and software, adapted to receive said acceleration value A via radio waves.

The storage means M3, the calculation means M4 and the comparison means M5 take the form of software in the location device 10', for example a microcontroller.

The clock H1 is, for example, a timer, or electronic counter.

In a second embodiment of the invention, the location device 10' calculates, from two acceleration values AC(t), AC(t−1) received at two consecutive instants (t−1) and (t), a distance d covered by the portable device SD' between said two instants (t−1), (t) (this is explained below). For this purpose, the location device 10' comprises means M6 for estimating the distance d covered.

In this second embodiment, the calculation means M4 then calculate a ratio R' between a variation of the strength value RSSI(t) thus measured, relative to a strength value RSSI(t−1) stored at a preceding instant, and the distance d covered between the two consecutive instants (t−1), (t).

The comparison means M5 compare the ratio R' thus calculated with at least one predetermined threshold S1', S2', in order to determine a distance D between the portable device SD' and the vehicle V.

Figure 4:
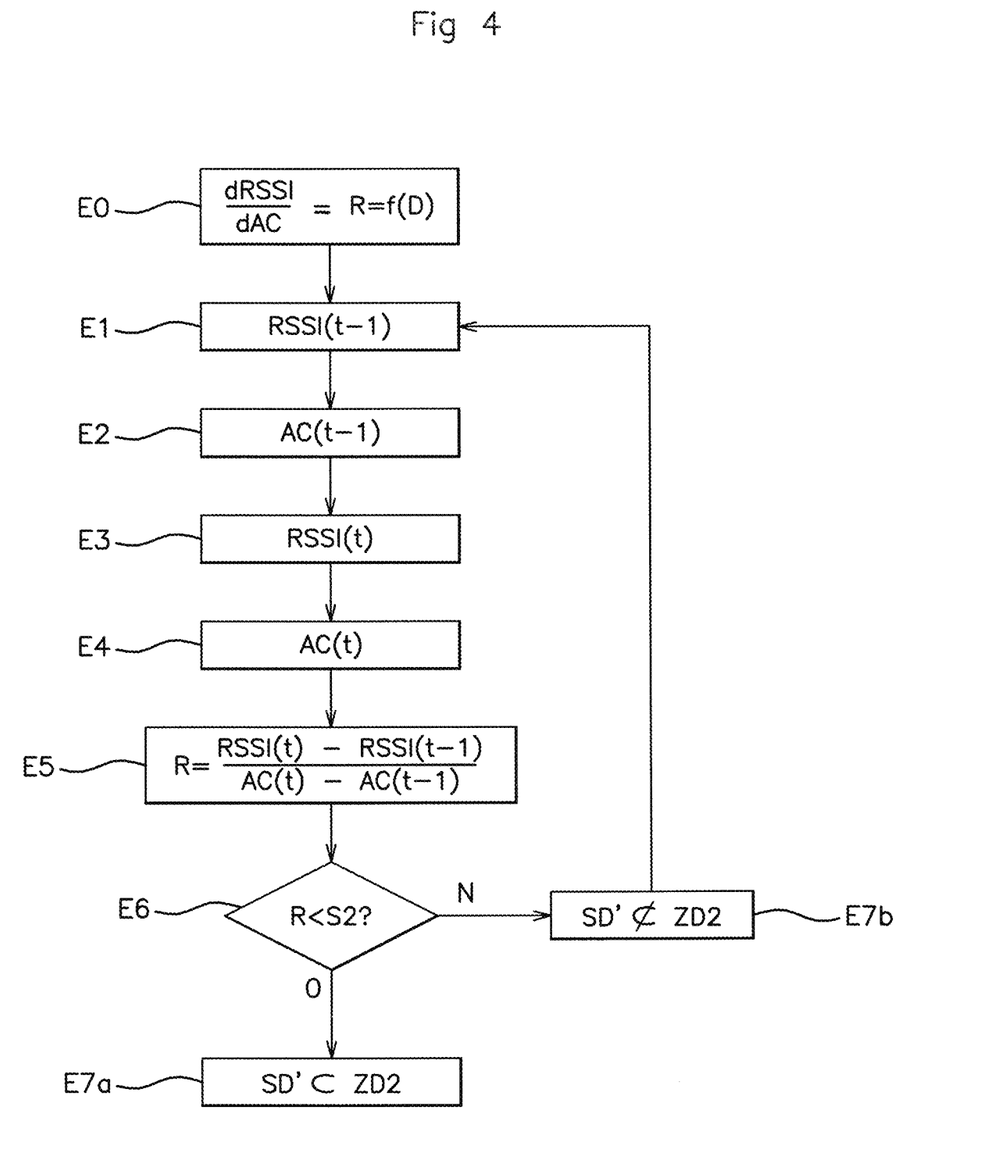
FIG. 4 is a flow chart showing the method for locating the portable device around the vehicle according to the invention.

The method for locating the portable device SD' around the vehicle V is shown in FIG. 4 and will now be described.

In a preliminary calibration step (E0), the distance D between the portable device SD' and the vehicle V is determined for a plurality of portable devices on the basis of the ratio R (or R') between a variation of the strength value RSSI of the signal received by the portable devices between two consecutive instants (t−1) and (t) and a variation of the strength value of acceleration AC(t−1)−AC(t) of said portable devices between said two consecutive instants (or, respectively, between a variation of the strength value RSSI of the signal received by the portable devices between two consecutive instants (t−1) and (t) and the distance d covered between said two instants).

In other words, the derivative of the value of the strength of the signal received, a value known as the "RSSI", is calculated, relative to the value of acceleration AC measured at the same instants.

That is to say, $$R = \frac{dRSSI}{dAC} = \frac{RSSI(t) - RSSI(t-1)}{AC(t) - AC(t-1)}$$

where

RSSI(t−1) is the measurement of the strength of the signal received at the instant t−1 (dB), RSSI(t) is the measurement of the strength of the signal received at the instant t (dB), AC(t−1) is the measurement of the acceleration at the instant t−1 (m²/s), AC(t) is the measurement of the acceleration at the instant t (m²/s).

In the second embodiment of the invention, the distance d covered between two consecutive acceleration measurements (AC(t−1), AC(t)) is calculated, after which the derivative of the RSSI measurement is calculated relative to the distance d covered between the two instants (t−1) and (t):

$$d = \frac{(AC(t-1) - A(t)) \times (\Delta t)^2}{2}$$

And:

$$R' = \frac{dRSSI}{d(d)} = \frac{RSSI(t) - RSSI(t-1)}{d}$$

Δt is the time elapsed (s) between the instant (t−1) and the instant (t), d is the distance covered (m) between the instant (t−1) and the instant t, RSSI(t−1) is the measurement of the strength of the signal received at the instant t−1 (dB), RSSI(t) is the measurement of the strength of the signal received at the instant t (dB), AC(t−1) is the measurement of the acceleration at the instant t−1 (m²/s), AC(t) is the measurement of the acceleration at the instant t (m²/s).

The time elapsed Δt may be a duration of sampling of the measurements, may be several milliseconds in length, and may be a fixed value.

Therefore, $$R' = \frac{dRSSI}{d(d)} = \frac{RSSI(t) - RSSI(t-1)}{(AC(t-1) - A(t)) \times (\Delta t)^2} \times 2$$

Since Δt is a fixed duration, that is to say a constant value, we find:

$$R' = \frac{dRSSI}{d(d)} = \frac{RSSI(t) - RSSI(t-1)}{(AC(t-1) - A(t)) \times (\Delta t)^2} \times 2$$

$$R' = K \times R$$

where K is a constant equal to:

$$K = \frac{2}{(\Delta t)^2}$$

The applicant has found that the curve representing the derivative of the value RSSI with respect to the distance d covered by the portable device (or with respect to the variation of acceleration AC) between the same instants, as a function of the distance D between the portable device SD' and the vehicle V, is unique, regardless of the type of portable device SD'.

Figure 3:
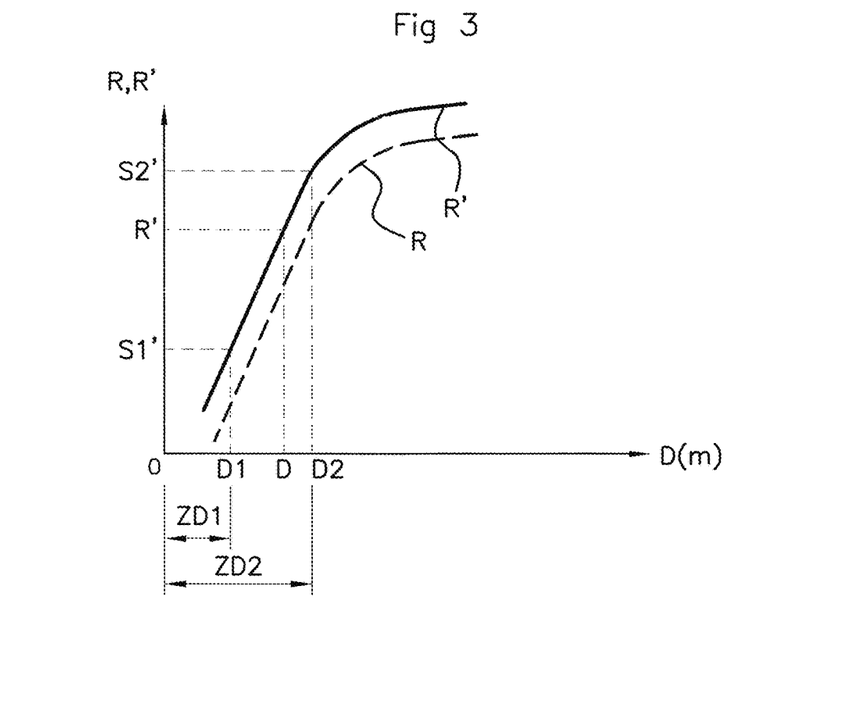
FIG. 3 is a graphic representation of the derivative of the RSSI measurement according to the distance D between the portable device and the vehicle, for different types of portable device, according to the invention.

This is shown in FIG. 3.

FIG. 3 shows the curves of the derivative of the value RSSI with respect to the distance covered, that is to say the ratio R', where $$R' = \frac{d(RSSI)}{d(d)}$$

and of the derivative of the value RSSI with respect to the variation of acceleration (AC(t−1)−AC(t)) as a function of the distance D between the portable device SD' and the vehicle V, for a number of types of portable user device.

It is evident from FIG. 3 that a value of said ratio R' (or a value of the ratio R) corresponds to a single value of distance D between the various portable devices SD' and the vehicle V.

The preliminary calibration step E0 may be used to set the thresholds S1', S2' (or S1, S2) of the derivative R' (or R) of the value of strength with respect to the distance d covered (or, respectively, with respect to the variation of acceleration) corresponding to distances D1, D2 around the vehicle V.

By comparing the value of the ratio R' to predetermined thresholds S1', S2', it is thus possible to determine the distance D between the portable device SD' and the vehicle V.

This is because the variability found among a number of types of portable device in the determination of the distance D as a function of the measured value RSSI is mainly (or entirely) due to gains in antenna amplification, which differ with the portable devices.

The ingenious use, according to the invention, of the derivative of the RSSI measurement relative to the distance d covered by the portable device SD between said two RSSI measurements makes it possible to cancel the effect of these gains on the determination of the distance D.

After this preliminary step E0 of determining the function R=f(D), or R'=f(D), the method of determination according to the invention consists of the following actions whenever the portable device SD' receives a radio signal from the location device 10:

step E3: Measuring and storing a value of strength RSSI (t) of the signal thus received, step E4: Measuring and storing a value of acceleration AC(t) of the portable device, step E5: Calculating the ratio R between a variation of the strength value RSSI(t) thus measured, relative to a strength value RSSI(t−1) stored at a preceding instant (step E1), and a variation of the acceleration value AC(t) thus measured, relative to an acceleration value AC(t−1) stored at said preceding instant (step E2), i.e.:

$$R = \frac{RSSI(t) - RSSI(t-1)}{AC(t) - AC(t-1)}$$

step E6: Comparing the ratio R thus calculated with at least one predetermined threshold S1, S2, in order to determine a distance D (E7a, E7b) between the portable device SD' and the vehicle V.

The predetermined thresholds S1, S2 correspond to distances D1, D2 around the vehicle (see FIG. 3) defining the first predetermined area ZD1 and the second predetermined area ZD2, established during the preliminary calibration stage E0.

The first threshold S1 is associated with a first distance D1, which defines a first predetermined area ZD1 around the vehicle.

The second threshold S2 is associated with a second distance D2, greater than the first distance D1, which defines a second predetermined area ZD2 around the vehicle V which is larger than the first predetermined area ZD1.

If the calculated ratio R is below the second threshold S2, this means that the portable device SD' is located in the second predetermined area ZD2.

If the calculated ratio R is below the first threshold S1, this means that the portable device SD' is located in the first predetermined area ZD1.

FIG. 3 also shows the derivative R' of the RSSI measurement relative to the distance d covered, as well as a first threshold S1' and a second threshold S2'.

In the example shown in FIG. 3, the calculated ratio R' is above the first threshold S1' and below the second threshold S2'. The portable device SD' is therefore in the second area ZD2.

For example, in the case of R', the derivative of the RSSI measurement relative to the distance d covered, we find:
S1'=−60 dB/m corresponds to D1=2 m.
S2'=−20 dB/m corresponds to D2=5 m.

In FIG. 4, the method of determination is illustrated on the assumption that there is only one predetermined area around the vehicle V, for example the second predetermined area ZD2.

In the example of the method shown in FIG. 4, if the calculated ratio R is below the second threshold S2, this means that the portable device SD' is located in the second predetermined area ZD2 (step E7a), while, if the ratio R is above the second threshold S2, the portable device SD' is not located in the second predetermined area ZD2 (step E7b).

Evidently, a plurality of predetermined areas may be defined around the vehicle V, each one associated with a distance and therefore with a threshold.

In a second embodiment of the invention, the method comprises, before step E5, a step of calculating a distance d covered between the two acceleration measurements AC(t) and AC(t−1), and step E5 consists in calculating the ratio R' between a variation of the strength value thus measured, relative to a strength value stored at a preceding instant (E1), and the distance d covered between said two consecutive instants (t−1), (t). Step E6 consists in comparing the ratio R' thus calculated with at least one predetermined threshold S2'.

In a preferred embodiment, whenever the portable device SD' receives a radio signal from the location device 10',
during step E3, the strength value RSSI(t) measured by the portable device SD' by means of the first measurement means M10 is sent to the location device 10' by the first transmission means M30, so that said location device 10' stores said strength value RSSI(t), using the storage means M3,
during step E4, the acceleration value AC(t) measured by the portable device SD' by means of the first measurement means M20 is sent to the location device 10', using the second transmission means M40, so that said location device 10' stores said strength value AC(t), using the storage means M3, steps E5 and E6 are then executed, respectively, by the calculation means M4 and by the comparison means M5 located in the location device 10'.

The method of determination is repeated at a fixed frequency, so that the location of the portable device SD' around the vehicle V is regularly determined.

Clearly, it is also possible for all of steps E3 to E6 to be executed by the portable device SD', in which case said portable device SD' comprises means for storing the strength value RSSI(t), means for storing the acceleration value AC(t), means for calculating the ratio R (or R'), and means M5 for comparing said ratio R with the predetermined threshold value S1, S2 (or S1', S2').

Additionally, for implementing the second embodiment, the portable device SD' comprises means for calculating the distance d covered.

Thus the invention advantageously enables the distance D between the portable device SD' and the vehicle V to be determined, regardless of the type of portable device.

Furthermore, the determination device according to the invention is inexpensive, because it only consists of software means.

The invention claimed is:

1. Method of determining the position of a portable user device (SD') around a vehicle (V) using a location device (10') on board said vehicle (V) and communicating with the portable device (SD') by radio waves, said portable device (SD') being equipped with an electronic circuit for measuring the received signal strength, and with an accelerometer or internal clock (M20) for acceleration measurement, wherein whenever the portable device (SD') receives a signal from the location device (10'), the method comprises:
Measuring and storing a value of strength of the signal (RSSI(t)) thus received,
Measuring and storing a value of acceleration (AC(t)) of the portable device (SD'),
Calculating a ratio (R) between a variation of the strength value thus measured, relative to a strength value stored at a preceding instant (RSSI(t−1)-RSSI(t)), and a variation of the acceleration value thus measured, relative to an acceleration value stored at said preceding instant (AC(t−1)-AC(t)),
Comparing the ratio (R) thus calculated with at least one predetermined threshold (S1, S2), in order to determine a distance (D) between the portable device and the vehicle.

2. Method of determination according to claim 1, further comprising, before calculating the ratio (R), calculating a distance (d) covered on the basis of the variation of the acceleration value thus measured, relative to an acceleration value stored at a preceding instant (AC(t−1)-AC(t)), wherein:
calculating the ratio (R) consists in calculating a ratio (R') between the variation of the strength value thus measured, relative to a strength value stored at said preceding instant, and the distance (d) covered,
calculating the distance (d) consists in comparing the ratio (R') thus calculated with a predetermined threshold (S1', S2'), in order to determine a distance (D) between the portable device and the vehicle.

3. Method of determination according to claim 2, further comprising, before the measuring and storing of the value of strength of the signal (RSSI(t)), determining the distance (D) between the portable device (SD') and the vehicle (V) for a plurality of portable devices on the basis of the ratio (R') between a variation of the value of the strength of the signal received between two consecutive instants (RSSI(t−1)-RSSI (t)), and the distance (d) covered by the portable device (SD') between said two consecutive instants.

4. Method of determination according to claim 3, further comprising:
during the measuring and storing of the value of strength of the signal (RSSI(t)), after the measurement of the strength value (RSSI(t)) measured by the portable device (SD'), a step of sending the strength value (RSSI(t)) to the location device (10'), so that said location device (10') stores said strength value (RSSI (t)),
during the measuring and storing of the value of acceleration (AC(t)) of the portable device (SD'), after the measurement of the acceleration value (AC(t)) measured by the portable device (SD'), sending the acceleration value (AC(t)) to the location device (10'), so that said location device (10') stores said strength value (AC(t)).

5. Method of determination according to claim 2, further comprising:
during the measuring and storing of the value of strength of the signal (RSSI(t)), after the measurement of the strength value (RSSI(t)) measured by the portable device (SD'), sending the strength value (RSSI(t)) to the location device (10'), so that said location device (10') stores said strength value (RSSI(t)),
during the measuring and storing of the value of acceleration (AC(t)) of the portable device (SD'), after the measurement of the acceleration value (AC(t)) measured by the portable device (SD'), sending the acceleration value (AC(t)) to the location device (10'), so that said location device (10') stores said strength value (AC(t)).

6. Method of determination according to claim 1, further comprising, before the measuring and storing of the value of strength of the signal (RSSI(t)), determining the distance (D) between the portable device (SD') and the vehicle (V) for a plurality of portable devices on the basis of the ratio (R) between a variation of the value of the strength of the signal received between two consecutive instants (RSSI(t−1)-RSSI(t)), and a variation of the value of acceleration of the portable device between said two consecutive instants (AC(t−1)-AC(t)).

7. Method of determination according to claim 6, further comprising:
during the measuring and storing of the value of strength of the signal (RSSI(t)), after the measurement of the strength value (RSSI(t)) measured by the portable device (SD'), sending the strength value (RSSI(t)) to the location device (10'), so that said location device (10') stores said strength value (RSSI(t)),
during the measuring and storing of the value of acceleration (AC(t)) of the portable device (SD'), after the measurement of the acceleration value (AC(t)) measured by the portable device (SD'), sending the acceleration value (AC(t)) to the location device (10'), so that said location device (10') stores said strength value (AC(t)).

8. Method of determination according to claim 1, further comprising:
during the measuring and storing of the value of strength of the signal (RSSI(t)), after the measurement of the strength value (RSSI(t)) measured by the portable device (SD'), sending the strength value (RSSI(t)) to the location device (10'), so that said location device (10') stores said strength value (RSSI(t)),
during the measuring and storing of the value of acceleration (AC(t)) of the portable device (SD'), after the measurement of the acceleration value (AC(t)) measured by the portable device (SD'), sending the acceleration value (AC(t)) to the location device (10'), so that said location device (10') stores said strength value (AC(t)).

9. A location device (10') for locating a portable user device (SD') around a vehicle (V), said device (10') being on board the vehicle (V), and communicating with the portable device (SD') by radio waves, said device (10') comprising one or more antennas and electronic circuits configured for receiving a signal strength value sent by the portable device (SD') and configured for receiving an acceleration value (AC(t)) sent by the portable device (SD'), said device (10') further comprising: •one or more microcontrollers configured for storing the strength values (RSSI(t)) and acceleration values (AC(t)) thus received, configured for calculating a ratio (R) between a variation of the strength value thus measured, relative to a strength value stored at a preceding instant (RSSI(t−1)-RSSI(t)), and a variation of the acceleration value thus measured, relative to an acceleration value stored at said preceding instant (AC(t−1)-AC(t)), and configured for comparing the ratio (R) thus calculated with at least one predetermined threshold (S1, S2), in order to determine a distance (D) between the portable device (SD') and the vehicle (V), and
a clock (H1).

10. Location device (10') according to claim 9, wherein the one or more microcontrollers is further configured
for calculating a distance (d) covered between two consecutive instants by the portable device (SD'), on the basis of the received measurements of the acceleration value (AC(t−1), AC(t)), and wherein:
for calculating a ratio (R') between a variation of the strength value thus measured between said two consecutive instants and the distance (d) covered, and
for comparing the ratio (R') thus calculated with at least one predetermined threshold (S1', S2'), in order to determine a distance (D) between the portable device (SD') and the vehicle (V).

11. Vehicle comprising a location device (10') according to claim 10.

12. System (1), comprising a vehicle (V) according to claim 11 and a portable user device (SD'), communicating by radio waves with a location device (10') on board a motor vehicle (V), the portable device being designed to be located around the vehicle (V) by said location device (10'), said portable device (SD') comprising:
one or more antennas and electronic circuits configured for measuring a received radio signal strength value (RSSI(t)), configured for measuring a value of acceleration (AC(t)) of said portable device (SD'), configured for transmitting said strength value to the location device (10'), and configured for transmitting the acceleration value (AC(t)) thus measured to the location device (10') and
a clock (H2).

13. Vehicle comprising a location device (10') according to claim 9.

14. System (1), comprising a vehicle (V) according to claim 13 and a portable user device (SD'), communicating by radio waves with a location device (10') on board a motor vehicle (V), the portable device being designed to be located around the vehicle (V) by said location device (10'), said portable device (SD') comprising:

one or more antennas and electronic circuits configured for measuring a received radio signal strength value (RSSI(t)), configured for measuring a value of acceleration (AC(t)) of said portable device (SD'), configured for transmitting said strength value to the location device (10'), and configured for transmitting the acceleration value (AC(t)) thus measured to the location device (10') and a clock (H2).

15. Portable user device (SD'), communicating by radio waves with a location device (10') on board a motor vehicle (V), the portable device being designed to be located around the vehicle (V) by said location device (10'), said portable device (SD') comprising:

one or more antennas and electronic circuits configured for measuring a received radio signal strength value (RSSI(t)) of a signal sent by the location device (10'), configured for measuring a value of acceleration (AC(t)) of said portable device (SD'), one or more microcontrollers configured for storing the strength values (RSSI(t)) and acceleration values (AC(t)) thus measured, configured for calculating a ratio (R) between a variation of the strength value thus measured, relative to a strength value stored at a preceding instant (RSSI(t−1)-RSSI(t)), and a variation of the acceleration value thus measured, relative to an acceleration value stored at said preceding instant (AC(t−1)-AC(t)), and configured for comparing the ratio (R) thus calculated with at least one predetermined threshold (S1, S2), in order to determine a distance (D) between the portable device (SD') and the vehicle (V), and a clock (H2).

* * * * *